United States Patent
Daniels-Farrar et al.

(10) Patent No.: US 8,090,777 B2
(45) Date of Patent: Jan. 3, 2012

(54) METHOD AND SYSTEM FOR MANAGING INSTANT MESSAGING INTERRUPTIONS

(75) Inventors: Fonda J. Daniels-Farrar, Cary, NC (US); Kent Filmore Hayes, Jr., Chapel Hill, NC (US); Angela Richards Jones, Cary, NC (US); Kalena Charisee Kelly, Raleigh, NC (US); John Michael Lake, Cary, NC (US); Ruthie D. Lyle, Durham, NC (US); Robert T. Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 11/306,568

(22) Filed: Jan. 3, 2006

(65) Prior Publication Data

US 2007/0156832 A1   Jul. 5, 2007

(51) Int. Cl.
  G06F 15/16   (2006.01)
  G06F 15/177   (2006.01)
  G06F 15/173   (2006.01)
(52) U.S. Cl. ........ 709/206; 709/204; 709/205; 709/209; 709/222; 709/223; 709/224; 709/225; 709/226
(58) Field of Classification Search .................. 709/206
  See application file for complete search history.

(56) References Cited

U.S. PATENT DOCUMENTS

| 6,484,196 | B1 | 11/2002 | Maurille | |
|---|---|---|---|---|
| 2003/0123431 | A1 | 7/2003 | Geck et al. | |
| 2004/0154022 | A1* | 8/2004 | Boss et al. | 719/310 |
| 2004/0172455 | A1* | 9/2004 | Green et al. | 709/207 |
| 2007/0016641 | A1* | 1/2007 | Broomhall | 709/206 |
| 2008/0216022 | A1* | 9/2008 | Lorch et al. | 715/847 |

OTHER PUBLICATIONS

Avrahami, Daniel, et al, QnA: Augmenting an Instant Messaging Client to Balance User Responsiveness and Performance, Letters CHI, vol. 6 Issue 3, pp. 515-518.
Cutrell, Edward B., et al., Effects of Instant Messaging Interruptions on Computing Tasks, Interactive Posters, Apr. 1-6, 2000, pp. 99-100.
Avrahami, Daniel, et al, QnA: Augmenting an Instant Messaging Client to Balance User Responsiveness and Performance, Letters CHI, vol. 6 Issue 3, pp. 515-518. IDS Date: 2004.
Ho, Joyce, et al., Using Context-Aware Computing to Reduce the Perceived Burden of Interruptions from Mobile Devices, CHI 2005, Apr. 2-7, pp. 909-918.

* cited by examiner

*Primary Examiner* — Kevin Bates
*Assistant Examiner* — Angela Nguyen
(74) *Attorney, Agent, or Firm* — Moore & Van Allen PLLC; Charles L. Moore

(57) ABSTRACT

A method for managing instant messaging interruptions may include comparing at least one term in an instant message to a plurality of terms in a no-response-required (NRR) library. The method may also include representing the instant message as an instant message agent character (IMAC) in response to a match between at least one term in the instant message and at least one of the plurality of terms in the NRR library.

19 Claims, 8 Drawing Sheets

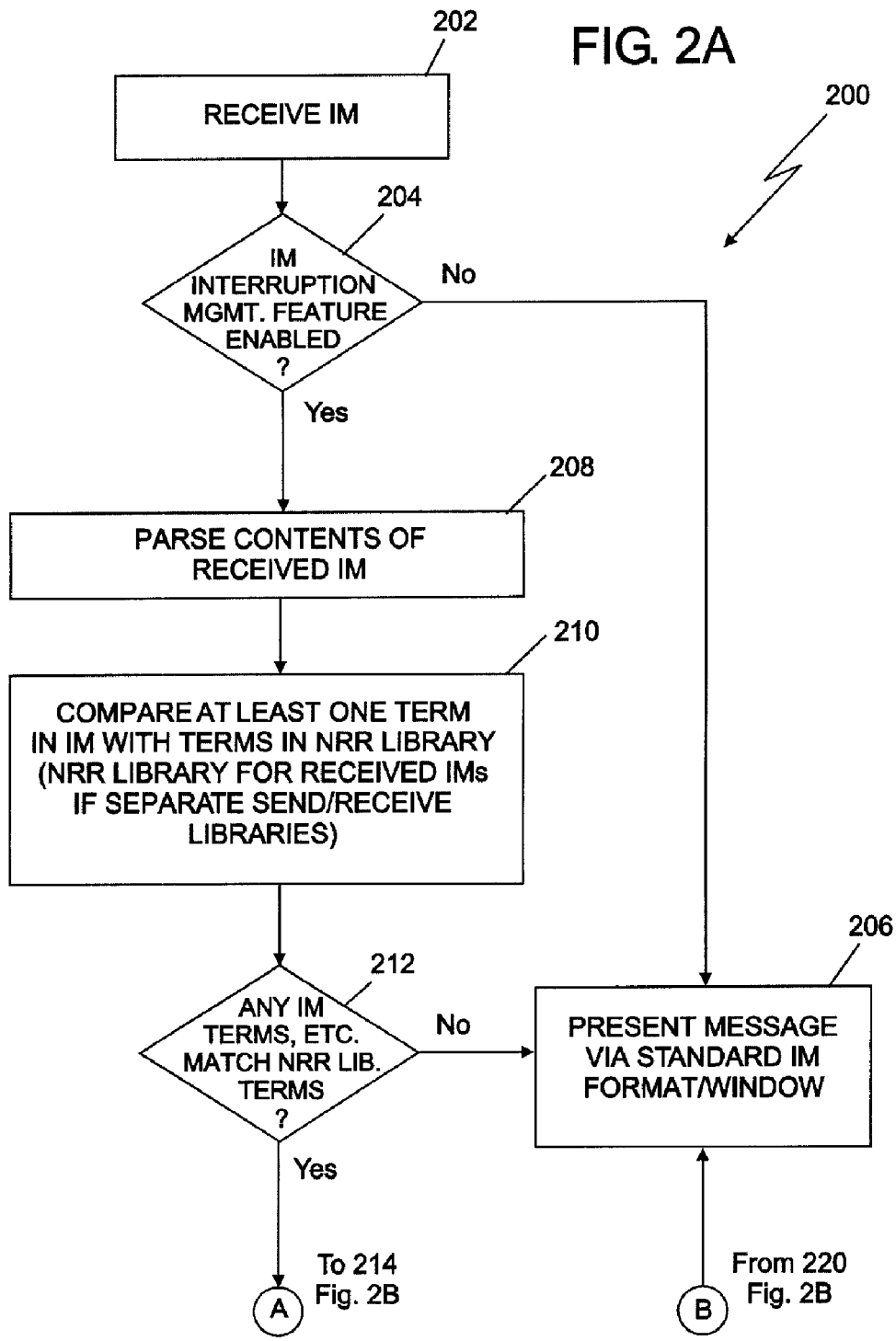

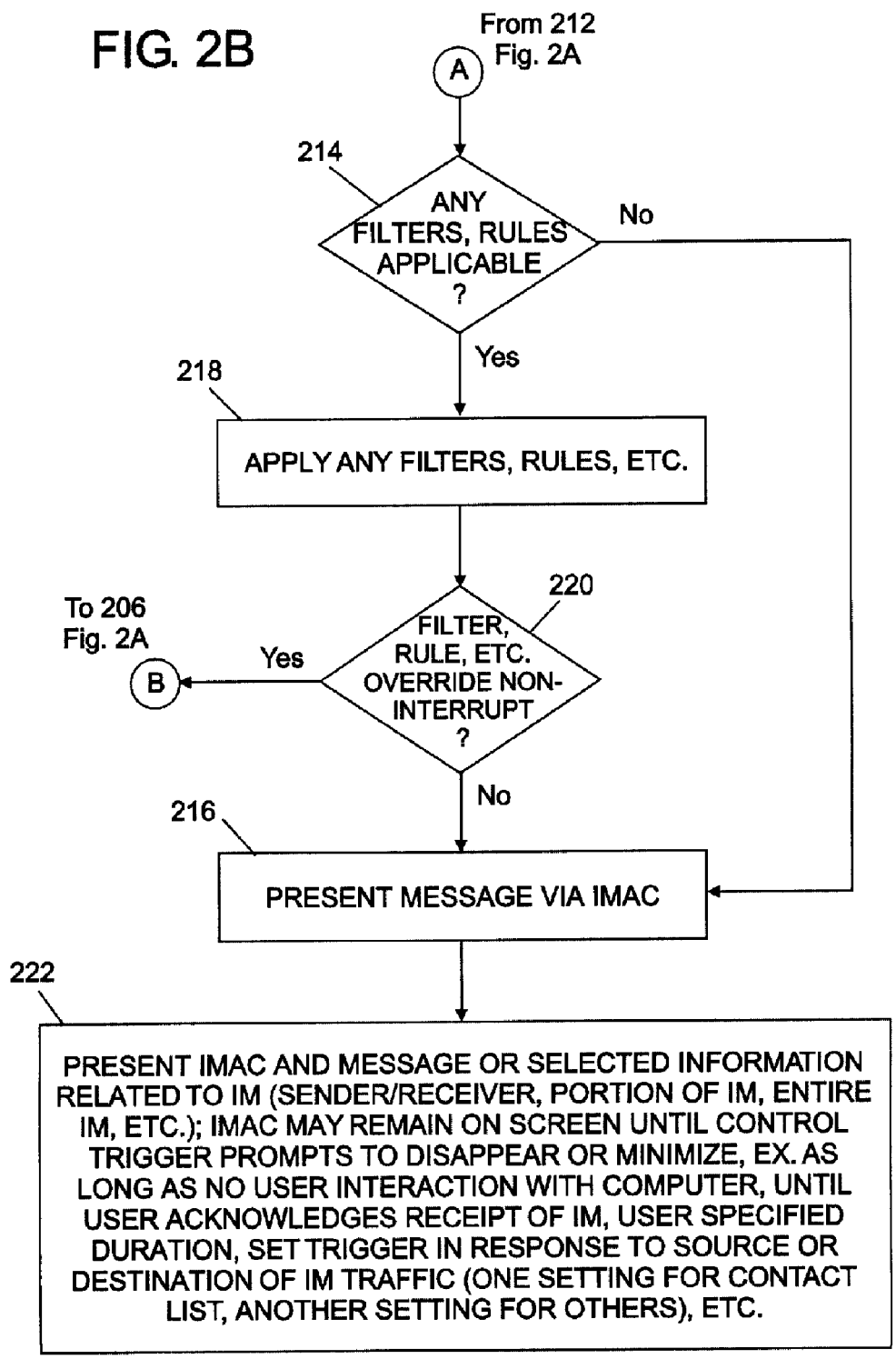

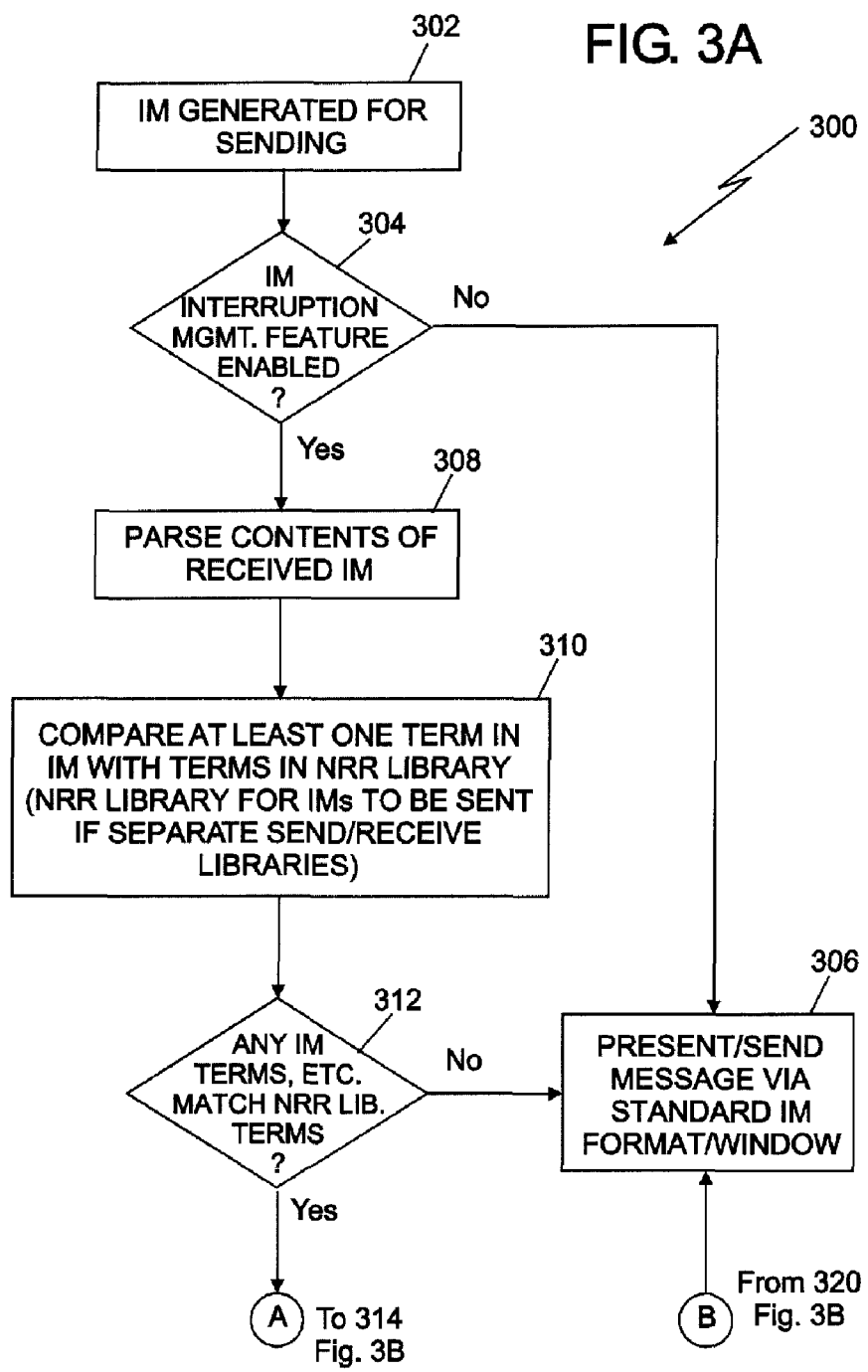

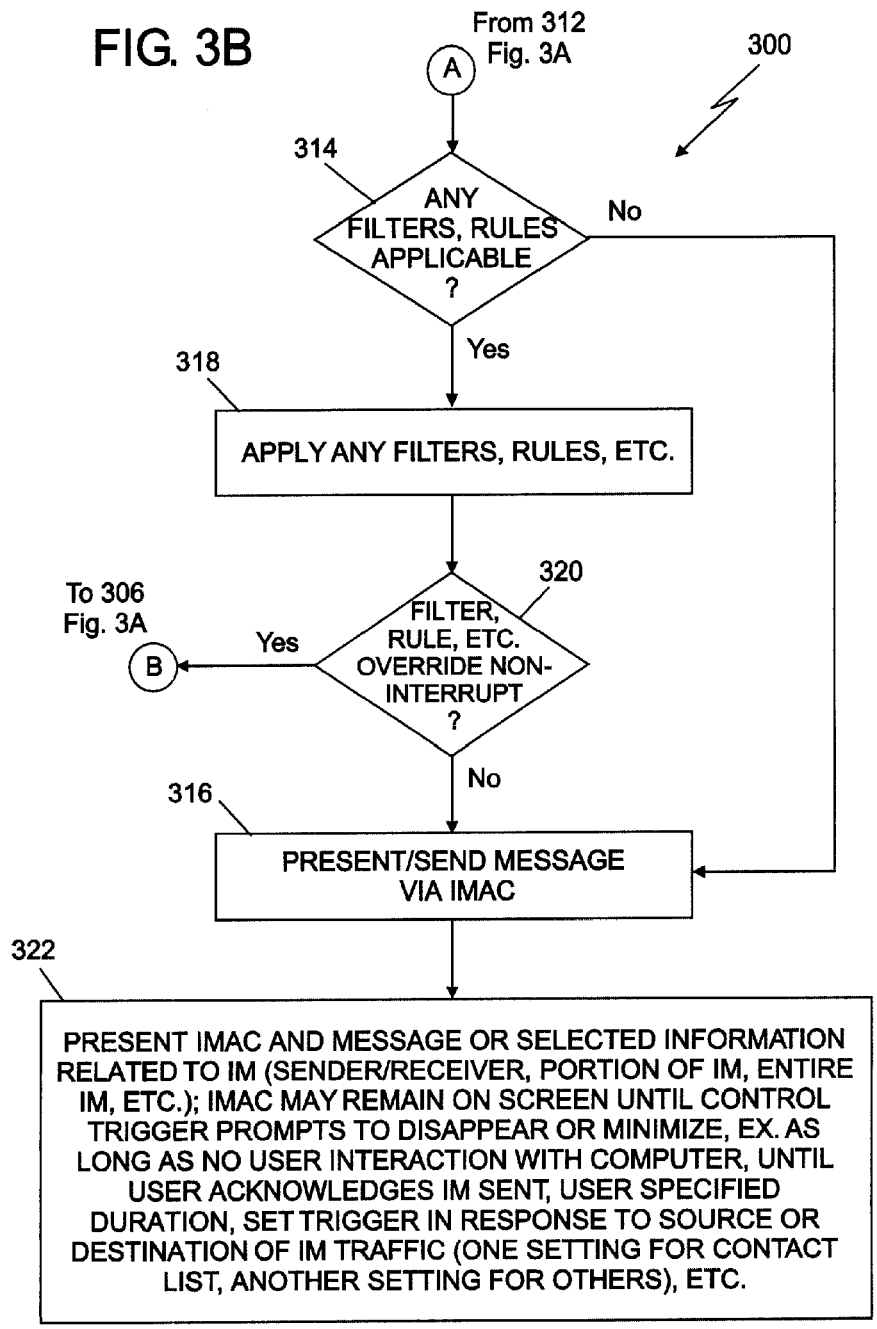

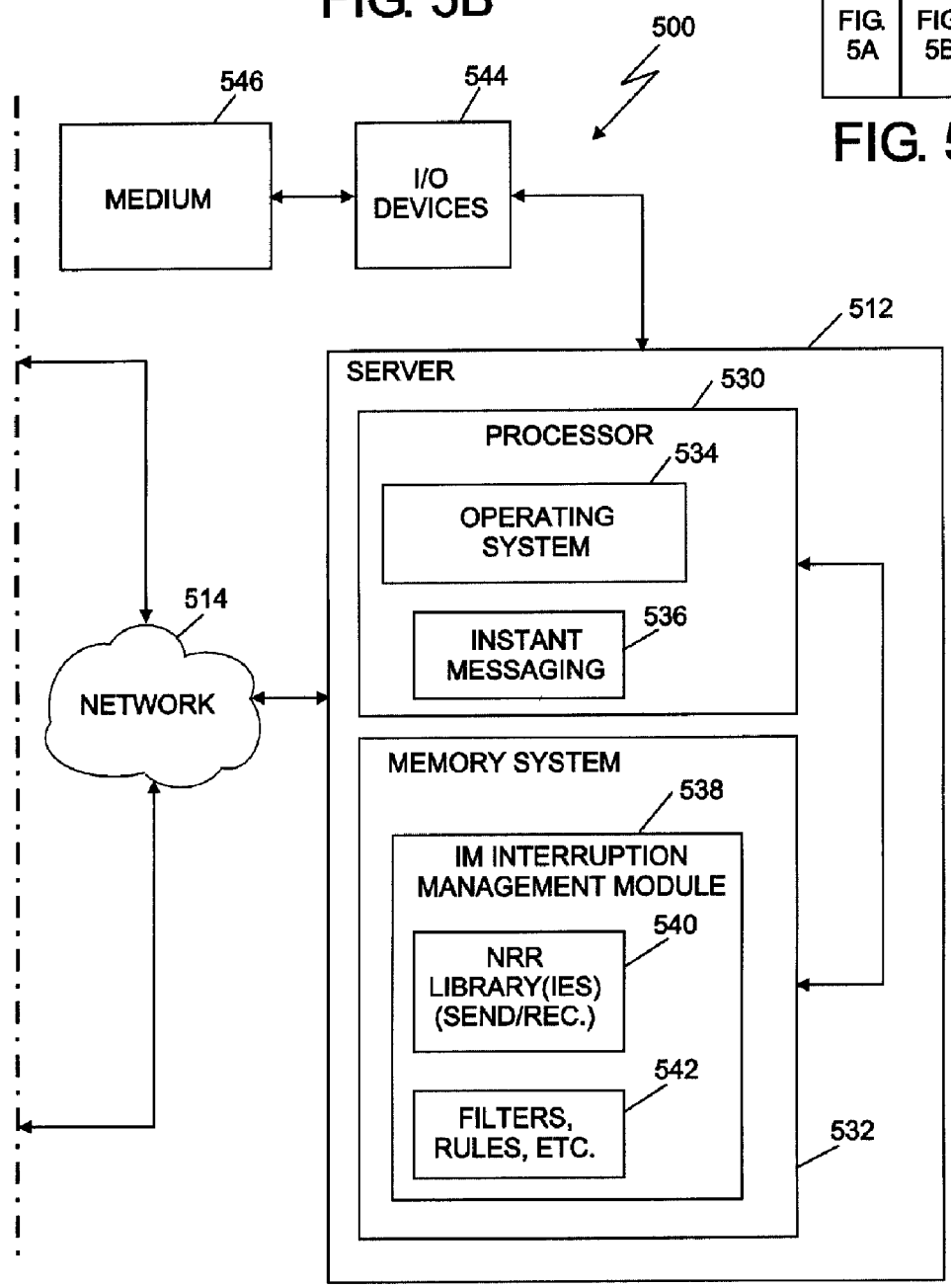

US 8,090,777 B2

METHOD AND SYSTEM FOR MANAGING INSTANT MESSAGING INTERRUPTIONS

BACKGROUND OF THE INVENTION

The present invention relates to communications, instant messaging and the like, and more particularly to a method and system for managing instant messaging interruptions.

Instant messaging (IM) is a means of communication wherein individuals can communicate with one another over a network, such as the Internet, intranet or other private network using a communications device, such as a personal computer (PC), mobile computing device, personal digital assistance (PDA) with Internet capability, cellular telephone or the like or a real-time basis. The communication is accomplished by typing messages into the communications device.

Use of IM is becoming more prolific. Analysts predict that corporate or business use of instant message may increase significantly over the next few years. While IM may prove to be quite useful in corporate or business environments, it may become a nuisance and result in lost productivity when a user is prompted to stop what she is presently doing to open an IM session, only to discover that the message may not require a response. For example, the following messages may not require a response, and a receiver may prefer not to be interrupted if one of these messages is received:
"okay," "ok," or any variation thereof that expresses acceptance or approval; "thanks," "thx," or variations thereof; "you're welcome," "yw," "no problem," "np" or similar expressions.

BRIEF SUMMARY OF THE INVENTION

In accordance with an embodiment of the present invention, a method for managing instant messaging (IM) interruptions may include comparing at least one term in an instant message to a plurality of terms in a no-response-required (NRR) library. The method may also include representing the instant message as an instant message agent character (IMAC) in response to a match between at least one term in the instant message and at least one of the plurality of terms in the NRR library.

In accordance with another embodiment of the present invention, a system for managing instant messaging interruptions may include an instant messaging application. The system may also include an instant messaging interruption management module operable in association with the instant messaging application.

In accordance with another embodiment of the present invention, a computer program product for managing instant messaging interrupts may include a computer usable medium having computer usable program code embodied therein. The computer usable medium may include computer usable program code configured to compare at least one term in an instant message to a plurality of terms in a no-response-required (NRR) library. The computer usable medium may also include computer usable program code configured to represent the instant message as an instant message agent character (IMAC) in response to a match between at least one term in the instant message and at least one of the plurality of terms in the NRR library.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIGS. 2A and 2B (collectively FIG. 2) are a flow chart of an example of a method for managing instant messaging interruptions in accordance with an embodiment of the present invention in response to an instant message being received.

FIGS. 3A and 3B (collectively FIG. 3) are a flow chart of an example of a method for managing instant messaging interruptions in accordance with an embodiment of the present invention in response to an instant message being sent.

DETAILED DESCRIPTION OF THE INVENTION

Figure 1:
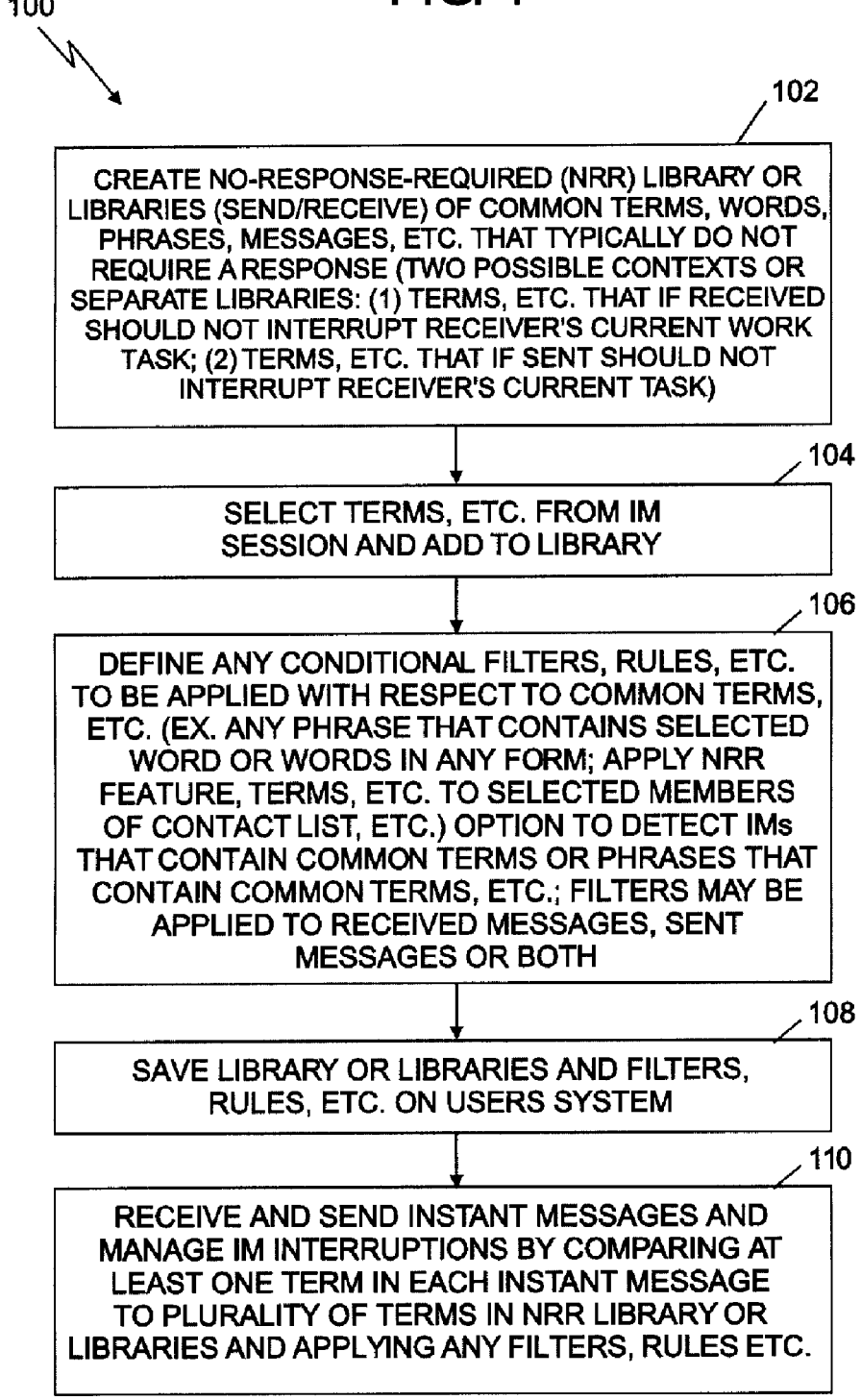
FIG. 1 is a flow chart of an example of a method for managing instant messaging interruptions in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a flow chart of an example of a method 100 for managing instant messaging interruptions in accordance with an embodiment of the present invention. In block 102, a no-response-required (NRR) library or libraries may be created containing common terms, words, phrases, messages or the like that typically may not require a response. The word "term" or "terms" may be used herein to mean terms, words, phrases, messages, short-hand abbreviations or the like, or the singular of any of the preceding. The terms may involve or may be characterized in two contexts: (1) terms that if received should not interrupt a receiver's current work task and (2) terms that if sent should not interrupt the receiver's current work task, or similar contexts. Accordingly, there may be two libraries, for example, a send NRR library and a receive NRR library, or multiple libraries for different contexts, applications, senders and receivers, etc. The send NRR library may contain terms to check or compare for common terms in an instant message before sending the message and the receive NRR library may contain terms for checking or comparing for common terms in a received instant message before presenting the message.

In block 104, terms may be selected from instant messaging sessions to add to the NRR library or selected libraries. The libraries may be edited or modified from time-to-time by a user as IM colloquialisms change or for other reasons. The NRR library or libraries may be initially provided with a set of terms, short-hand, colloquialisms or the like in common usage with respect to instant messaging.

In block 106, any conditional filters, rules or the like may be defined to be applied with respect to the common terms or the instant messaging. Examples of conditional filters or rules may include any phrase that contains a selected word or words in any form, such as "bye," "good bye," "bye bye," "bye now," or the like; apply the NRR feature, interruption management feature, or NRR libraries to selected members of a contact list or other select group or individuals. A user may select options to apply filters or rules to only received messages, only messages to be sent or to both. A user may also select whether to enable or disable the non-interrupt feature or interruption management feature or module.

In block 108, the NRR library or libraries and filters, rules or the like may be saved on a users system, such as a computer system, mobile computing system, mobile communications device or any device or system with an instant messaging capability. In another embodiment of the present invention, as described in more detail herein, the libraries, filters, rules or the like may be stored on a system or network, such as a server or other location on a system or network. This may be the case, for example, when a communications device has limited storage capacity or computing capacity or both.

In block 110, instant messages or the like may received and sent and instant messaging interruptions may be managed, as described in more detail with respect to FIGS. 2 and 3. The instant messaging interruptions may be managed by comparing at least one term in each instant message, in either a received message or a message to be sent, to the plurality of terms in the NRR library or appropriate NRR library if more than one, such as send and receive libraries. The instant messaging interruptions may be further managed as described in more detail herein by applying any applicable filters, rules or the like.

FIGS. 2A and 2B (collectively FIG. 2) are a flow chart of an example of a method 200 for managing instant messaging interruptions in accordance with an embodiment of the present invention in response to an instant message being received. In block 202, an instant message may be received. In block 204, a determination may be made whether an IM interruption management feature or module is enabled. If the IM interruption management feature is not enabled in block 204, the method 200 may advance to block 206 and the instant message may be presented in a standard IM format or window. If the IM interruption management feature is enabled in block 204, the method 200 may advance to block 208.

In block 208, the contents of the received IM may be parsed to facilitate comparing terms in block 210. In block 210, at least one term in the received instant message may be compared with the plurality of terms in an NRR library or NRR library for received instant messages if separate send and receive libraries are available.

In block 212, a determination may be made whether any terms in the received instant message match any terms in the NRR library. If no terms in the instant message match any terms in the NRR library, the method 200 may advance to block 206 and the instant message may be presented in the standard format or window. If a term in the received instant message matches any term in the NRR library, the method 200 may advance to block 214.

In block 214, a determination may be made if any filters, rules or the like may be applicable. If there are no applicable filters or rules in block 214, the method 200 may advance to block 216. In block 216, the instant message may be presented as an instant message agent character (IMAC) or the like. If there are applicable filters, rules or the like in block 214, the method 200 may advance to block 218. In block 218, the filters, rules, etc. may be applied.

In block 220, a determination may be made if a filter, rule or the like overrides the non-interrupt or interruption management feature or further modifies or specifies how the instant message or IMAC should be presented. If the filter or rule overrides the non-interrupt or interruption management feature, the method 200 may advance to block 206 and the instant message may be presented in the standard format or window. If the applicable filter or rule does not override interruption management feature or merely modifies presentation of the IMAC, the IMAC may be present in block 216 responsive to any applicable filters or rules.

In block 222, the IMAC may be presented. The IMAC may be presented in different formats and with selected information or abbreviated information related to the IM. For example, only the IMAC may be presented or the IMAC with an abbreviated message or information related to the message or the like may be presented. The IMAC may be presented along with an identity of the sender, a portion of the instant message, the entire instant message in a smaller captioned version or the like. An example of an IMAC will be described with reference to FIG. 4. The IMAC may be an icon, symbol or animated icon or symbol.

The IMAC may remain on a user's or receiving parties display, monitor or screen until a control trigger or the like prompts the IMAC to disappear or to be minimized. Examples of the control trigger may include displaying the IMAC for as long as there is no user interaction with the communications device, computer or system presenting the IMAC; the user may specify a duration that the IMAC may be presented; or similar control triggers. The control trigger may also be set in response to sources or destinations of IM traffic, such as there may be one setting for selected members in a contact list and another setting for others.

FIGS. 3A and 3B (collectively FIG. 3) are a flow chart of an example of a method 300 for managing instant messaging interruptions in accordance with an embodiment of the present invention in response to an instant message being sent. In block 302, an instant message may be generated for sending. In block 304, a determination may be made whether an IM interruption management feature or module is enabled. If the IM interruption management feature is not enabled in block 304, the method 300 may advance to block 306 and the instant message may be presented or sent to a receiver for presentation in a standard IM format or window. The receiver, however, may have an IM interruption management feature enabled similar to method 200 in FIG. 2 to manage instant message interruptions as described with respect to method 200. If the IM interruption management feature is enabled in block 304, the method 300 may advance to block 308.

In block 308, the contents of the IM to be sent may be parsed to facilitate comparing terms in block 310. In block 310, at least one term in the instant message to be sent may be compared with the plurality of terms in an NRR library or send NRR library for instant messages to be sent if separate send and receive libraries are available.

In block 312, a determination may be made whether any terms in the instant message to be sent match any terms in the NRR library. If no terms in the instant message match any terms in the NRR library, the method 300 may advance to block 306 and the instant message may be presented or sent to the receiver for presentation in the standard format or window unless overridden by the receivers IM interruption management feature or module. If a term in the instant message to be sent matches any term in the NRR library, the method 300 may advance to block 314.

In block 314, a determination may be made if any filters, rules or the like may be applicable. If there are no applicable filters or rules in block 314, the method 300 may advance to block 316. In block 316, the instant message may be presented or sent to the receiver to be presented as an IMAC or the like. If there are applicable filters, rules or the like in block 314, the method 300 may advance to block 318. In block 318, the applicable filter, rule, or the like may be applied.

In block 320, a determination may be made if the filter, rule or the like overrides the IM interruption management feature or further modifies or specifies how the instant message or IMAC should be presented. If the filter or rule overrides the IM interruption management feature, the method 300 may advance to block 306 and the instant message may be presented in the standard format or window. If the applicable filter or rule does not override the IM interruption management feature, the IMAC may be present and/or sent in block 316.

In block 322, the IMAC may be presented. As previously discussed, only the IMAC may be presented or the IMAC with a message, information related to the message or the like may be presented. An example of an IMAC in accordance with an embodiment of the present invention is illustrated FIG. 4.

Figure 4:
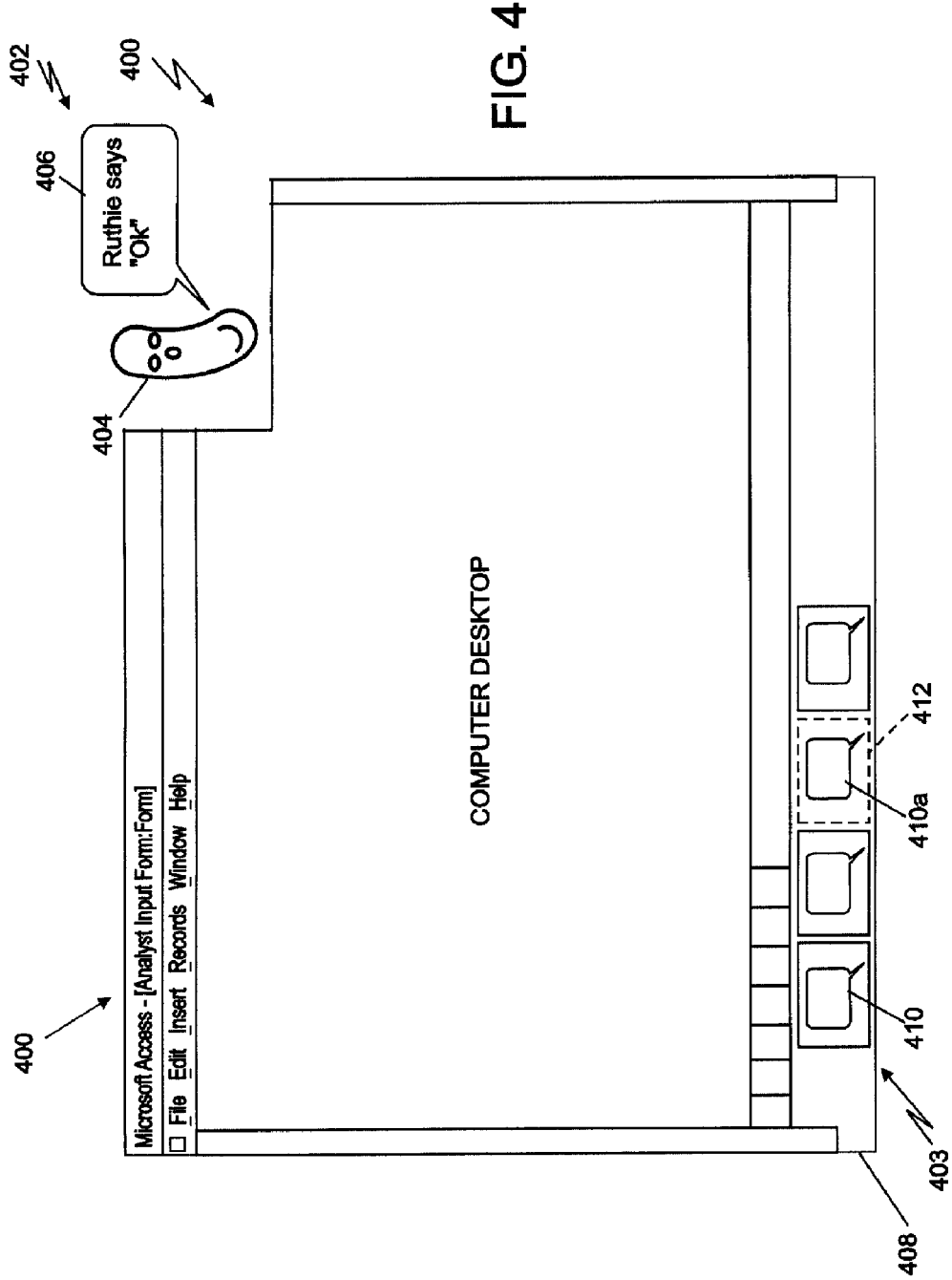
FIG. 4 is a graphical user interface (GUI), computer desktop or the like illustrating an example of a graphical representation of an Instant Messaging Agent Character (IMAC) and unopened instant messages in accordance with an embodiment of the present invention.

FIG. 4 is a graphical user interface (GUI) 400, computer desktop or the like illustrating an example of a graphical representation of an IMAC 402 and unopened instant messages 403 in accordance with an embodiment of the present invention. The IMAC 402 may include an icon 404, symbol or the like. The icon 404 may be animated to get a user's attention. An audible signal may also be produced in response to the IMAC 404 being generated and presented. The IMAC 402 may also include information 406 related to the instant message. For example, the IMAC 402 may identify the sender, may present a portion of the message, an abridged version of the message or the entire message if short or the message only contains the common term or terms in the NRR library. The instant message may be abbreviated to the common term or terms matched in the NRR library. The user or receiver may then be able to click-on the icon 404 or any portion of the IMAC 402 to present the entire message. The information 406 related to the instant message may be captioned or presented in a balloon format or the like similar to that illustrated in FIG. 4 or other format.

Unopened instant messages 403 or instant messages for which a control trigger may have activated may be presented in a task bar 408 or the like and may be represented by an appropriate symbol or icon. In the example illustrated in FIG. 4 the symbol representing the instant messages is a balloon 410 or conversation balloon. A balloon 410a corresponding to the active IMAC 402 or the IMAC 402 currently being presented may be highlighted or otherwise identified in the task bar 408 as illustrated by the dashed or broken line 412 in FIG. 4. Instant message sessions that may be active but unopened may be highlighted in a different manner or otherwise distinguished in the task bar 408 to facilitate managing the different IM sessions by the user.

Figure 5A:
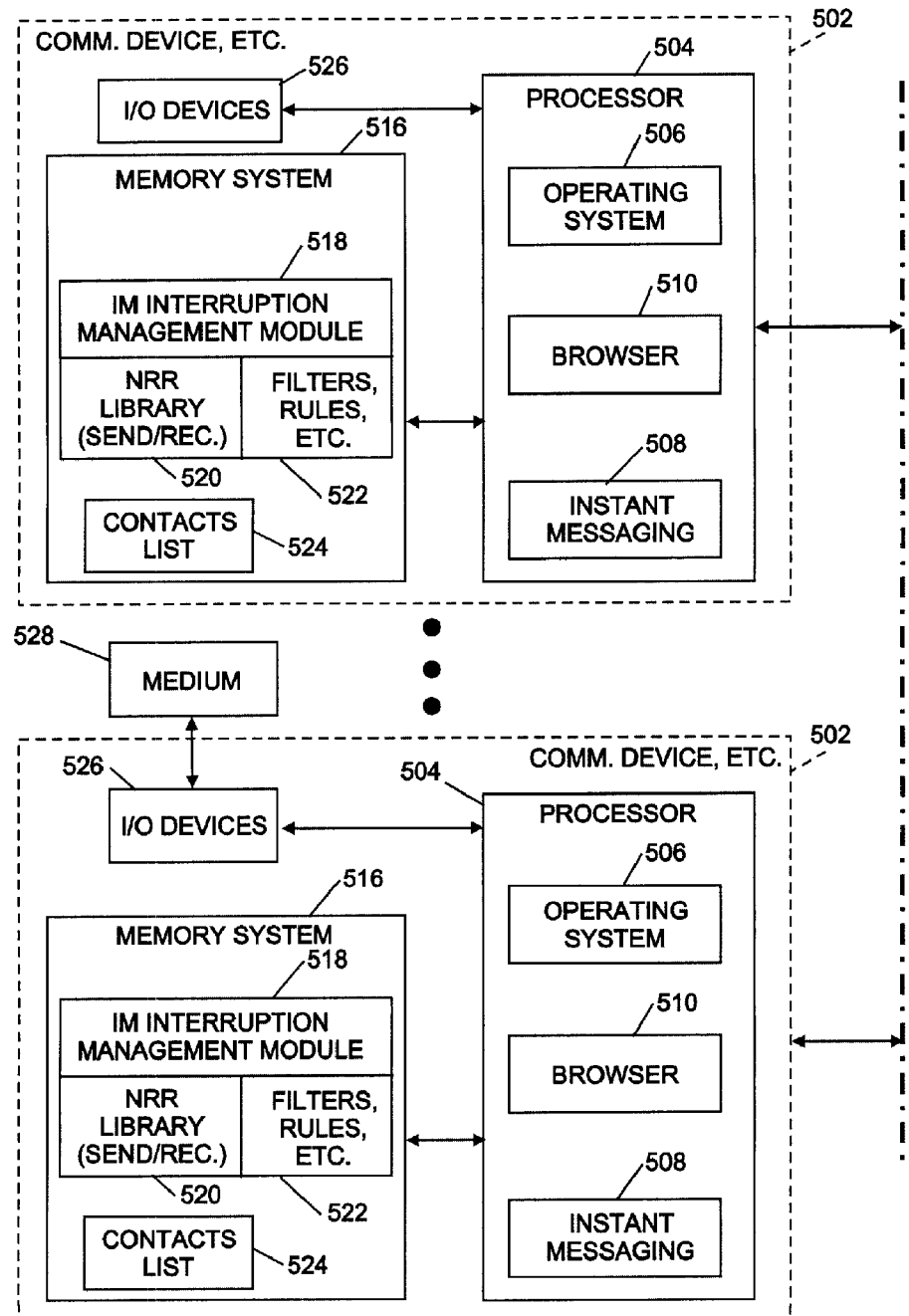
FIG. 5 is a block diagram of an example of a system for managing instant messaging interruptions in accordance with an embodiment of the present invention.

FIG. 5 is a block diagram of an example of a system 500 for managing instant messaging interruptions in accordance with an embodiment of the present invention. The system 500 may include a communications device 502 or system, computer system, portable communications device or the like with an instant messaging capability or similar functionality. The communications device 502 may include a processor 504. An operating system 506 may run or operate on the processor 504 to control operation of the device 502 and applications or programs that may perform specific operations or functions, such as an instant messaging application 508 and other functions or applications. A browser 510 may be provided to facilitate communications with other devices, servers, such as server 512, or the like via a network 514. The network 514 may be the Internet, intranet or other private network. The network 514 may be accessed via a wireless connection or a wired connection or any combination thereof.

The communications device or system 502 may also include a memory system 516. An IM interruption management module 518 or IM non-interrupt function or feature may also be provided and may be stored on the memory system for operation on the processor 504 or to interface with the instant messaging application 508. The IM interruption management module 518 may embody all or portions of the methods 100, 200 and 300 of FIGS. 1, 2 and 3 respectively. An NRR library 520 or libraries, for example send and receive libraries, similar to that previously described for use with the IM interruption management module 518, may be stored in the memory system 516. Conditional filters 522, rules and the like for use with the IM interruption management module 518 may also be provided or created and stored on the memory system 516. The memory system 516 may also store a contact list 524, buddy list or the like for use with the instant messaging application 508.

The communications device or system 502 may also include multiple input devices, output devices or combination input/output devices 526. The input and output devices or combination I/O devices 526 may permit a user to operate and interface with the communications device 502 and to control operation of the instant messaging program or application 508 and the IM interruption management module 518 as well as other applications or operations. The I/O devices 526 may also permit a user to enter or modify the NRR library 520 or libraries, add, delete and modify contacts in the contacts list 524, and add, delete and modify filters and rules 522. The I/O devices 526 may include a keyboard, keypad, pointing device, mouse or the like to control the IM functionality and other operations. The I/O devices 626 may also include disk drives, optical, mechanical, magnetic, or infrared input/output devices, modems or the like. The I/O devices 526 may be used to access a medium 528. The medium 528 may contain, store, communicate or transport computer-readable or computer useable instructions or other information for use by or in connection with a system, such as the user communication device 502 or computer system and system 500.

The server 512 may include a processor 530 and memory system 532. The processor 530 may also include an operating system 534 to control operation of the server 512 including server applications and programs, such as an instant messaging application 536. The instant messaging server application 536 may manage instant messaging across the network 514 between different communications devices, such as communications devices 502, as well as other functions related to instant messaging.

The memory system 532 may include an IM interruption management module 538 or IM non-interrupt module or feature to control IM interruption at a network level if appropriate for any IM functions or operations. The IM interruption management module 538 may coordinate and interface with the IM interruption management module 518 in the communications device 502.

In one embodiment of the present invention, an NRR library 540 or libraries and filters and rules 542 may also be stored and maintained at the server 512 or network level. Storing and maintaining the IM interruption management module 538 and NRR library 540 and filter and rules 542 at a server, such as server 512, may be particularly beneficial with regard to some embodiments of the present invention, for example where the communications device 502 may be a mobile device with limited storage capacity and possibly also limited computing capacity or operation using battery power.

I/O devices 544 may also be associated with the server 512 to provide an interface for controlling, maintaining and managing operation of the server 512. The I/O devices 544 may be similar to I/O devices 526 previously described. The I/O devices 544 may also be used to access a medium 546 similar to medium 528.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A computer implemented method for managing instant messaging interruptions, comprising:
receiving an instant message at a communications device, the instant message being sent to a user of the communications device from a user of a computing device, the instant message containing a common phrase that typically does not require a response from the user of the communication device;

comparing, after the instant message is received by the communications device, at least one term in the instant message to a plurality of terms in a no-response-required (NRR) library comprising a common phrase that typically does not require a response from the user of the communications device to the user of the computing device; and representing the instant message as an instant message agent character (IMAC) on the communications device of a recipient in response to a match between the at least one term in the instant message and at least one of the plurality of terms in the NRR library.

2. The method of claim 1, further comprising parsing contents of the instant message before comparing.

3. The method of claim 1, further comprising presenting the instant message in a standard format in response to one of an instant messaging interruption management feature not being enabled, the at least one term in the instant message not matching any terms of the plurality of terms in the NRR library and one of a filter and a rule overriding the instant messaging non-interrupt feature.

4. The method of claim 1, further comprising determining if any filter and rule apply to instant message.

5. The method of claim 1, further comprising applying one of a filter and a rule to an instant messaging interruption management feature in response to determining that one of the filter and the rule applies to the instant message.

6. The method of claim 1, wherein comparing the at least one term in the instant message to the plurality of terms in the NRR library comprises comparing the at least one term in at least one of an instant message being sent and an instant message being received.

7. The method of claim 1, wherein comparing at least one term comprises at least one of comparing the at least one term in an instant message to be sent to a plurality of terms in an NRR send library and comparing the at least one term in a received instant message to a plurality of terms in an NRR receive library.

8. The method of claim 1, further comprising applying a instant messaging non-interrupt feature to at least one of an entire contact list and one or more selected members of the contact list.

9. The method of claim 1, further comprising continuing to present at least the IMAC until prompting by a control trigger.

10. The method of claim 9, wherein prompting by the control trigger comprises one of:
acknowledging receipt of the instant message;
interaction by a user with a system presenting at least the IMAC;
sending the instant message; and
expiration of a duration set by a user.

11. A system for managing instant messaging interruptions, comprising:
a communications device configured to receive instant messages;
a no-response-required (NRR) library including a plurality of common phrases that, when a sender sends a message containing the common phrase to an intended recipient, typically does not require a response from the intended recipient;
an instant messaging application stored on the communications device and operable on the communications device, the instant messaging application configured for comparing, after an instant message is received by a user of a communications device from a user of a computing device, at least one term in the instant message to the plurality of common phrases in the NRR library;
an instant messaging interruption management module operable on the communications device in association with the instant messaging application; and
an instant messaging agent character (IMAC) generated by the instant messaging interrupt management module to represent the instant message on the communications device of the user in response to a match between the at least one term in the instant message and at least one of the plurality of common phrases in the NRR library.

12. The system of claim 11, wherein the instant message agent character (IMAC) is presentable in response to a match between at least one term in the NRR library and at least one term in the instant message.

13. The system of claim 11, further comprising a control trigger to control presentation of the IMAC.

14. The system of claim 11, further comprising at least one of a filter and a rule applicable in association with the instant messaging interruption management module.

15. A computer program product for managing instant messaging interrupts, the computer program product comprising:
a tangible non-volatile computer-usable storage medium having computer readable program code embodied therewith, the computer readable program code comprising:
computer usable program code configured to receive an instant message at a communications device, the instant message being sent to a user of the communications device from a user of a computing device, the instant message containing a common phrase that typically does not require a response from the user of the communication device;
computer usable program code configured to compare, after the instant message is received by the communications device, at least one term in the instant message to a plurality of terms in a no-response-required (NRR) library comprising a common phrase that typically does not require a response from the user of the communications device to the user of the computing device; and
computer usable program code configured to represent the instant message as an instant message agent character (IMAC) to a match between the at least one term in the instant message and at least one of the plurality of terms in the NRR library.

16. The computer program product of claim 15, further comprising computer usable program code configured to parse contents of the instant message to facilitate comparing the at least one term in an instant message to the plurality of terms in a no-response-required (NRR) library.

17. The computer program product of claim 15, further comprising computer usable program code configured to apply one of a filter and a rule to a non-interrupt feature in response to determining that one of the filter and the rule applies to the instant message.

18. The computer program product of claim 15, further comprising computer usable program code configured to apply an instant messaging interruption management feature to at least one of an entire contact list and one or more selected members of the contact list.

19. The computer program product of claim 15, further comprising computer usable program code configured to continue to present at least an IMAC until prompted by a control trigger.

* * * * *